United States Patent
Miyashita

(10) Patent No.: US 10,664,274 B2
(45) Date of Patent: May 26, 2020

(54) CONTROLLER AND EDITOR

(71) Applicant: Fanuc Corporation, Yamanashi (JP)

(72) Inventor: Shouhei Miyashita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/371,228

(22) Filed: Apr. 1, 2019

(65) Prior Publication Data

US 2019/0310850 A1  Oct. 10, 2019

(30) Foreign Application Priority Data

Apr. 9, 2018 (JP) .................................. 2018-075022

(51) Int. Cl.
   *G06F 9/30* (2018.01)
(52) U.S. Cl.
   CPC ...... *G06F 9/30065* (2013.01); *G06F 9/30032* (2013.01)
(58) Field of Classification Search
   CPC .......... A61K 31/13; A61P 25/18; A61P 25/32; A61P 29/00
   See application file for complete search history.

(56) References Cited

U.S. PATENT DOCUMENTS

| | | | | |
|---|---|---|---|---|
| 5,285,376 A | * | 2/1994 | Struger | G05B 19/056 700/18 |
| 7,272,815 B1 | * | 9/2007 | Eldridge | G06F 8/71 707/999.009 |
| 2006/0253626 A1 | * | 11/2006 | Ueno | G05B 19/058 710/62 |
| 2008/0126973 A1 | * | 5/2008 | Kline | G05B 19/056 715/772 |
| 2009/0125128 A1 | * | 5/2009 | Eldridge | G05B 15/02 700/86 |
| 2009/0240349 A1 | * | 9/2009 | Tanaka | G05B 19/054 700/19 |

FOREIGN PATENT DOCUMENTS

JP  7-210218 A  8/1995

* cited by examiner

*Primary Examiner* — Kidest Bahta
(74) *Attorney, Agent, or Firm* — RatnerPrestia

(57) ABSTRACT

A controller and an editor that enable a ladder program to escape an infinite loop are provided.
A controller that can detect a loop process being stuck in an infinite loop during execution of a ladder program includes an infinite loop escape unit for escaping the infinite loop by forcefully making an execution condition for a jump instruction false when the infinite loop occurs, the jump instruction being included in the loop process.

4 Claims, 12 Drawing Sheets

FIG.8

| NET NUMBER OF JUMP INSTRUCTION THAT MAY CAUSE INFINITE LOOP | EXECUTION CONDITION SIGNAL | CAUSE OF INFINITE LOOP | NET NUMBER THAT CONTROLS EXECUTION CONDITION SIGNAL [1] | NET NUMBER THAT CONTROLS EXECUTION CONDITION SIGNAL [2] | NET NUMBER THAT CONTROLS EXECUTION CONDITION SIGNAL [3] |
|---|---|---|---|---|---|
| 0110 | R0001.0···[1] F0000.5···[2] X0000.0···[3] | (R0001.0· F0000.5) +X0000.0 | 0101 | WITHOUT OVERWRITING WITHIN LOOP | WITHOUT OVERWRITING WITHIN LOOP |
| 0200 | R0001.0···[1] F0010.0···[2] | R0100.0+ X0010.0 | WITHOUT OVERWRITING WITHIN LOOP | 0195 | |
| ... | ... | ... | ... | ... | |
| 1000 | R0100.0···[1] | R0100.0 | 0999 | | |

FIG.10

| NET NUMBER OF JUMP INSTRUCTION THAT MAY CAUSE INFINITE LOOP | EXECUTION CONDITION SIGNAL | ... | SIGNAL STATE DURING LOOPING | SIGNAL STATE ON NORMAL COMPLETION |
|---|---|---|---|---|
| 0110 | R0001.0···[1]<br>F0000.5···[2]<br>X0000.0···[3] | ... | R0001.0=OFF<br>F0000.5=ON<br>X0000.0=OFF | R0001.0=ON<br>F0000.5=ON<br>X0000.0=OFF |
| 0200 | R0001.0···[1]<br>F0010.0···[2] | ... | ... | ... |
| ... | ... | ... | ... | ... |
| 1000 | R0100.0···[1] | ... | ... | ... |

CONTROLLER AND EDITOR

RELATED APPLICATIONS

The present application claims priority to Japanese Patent Application No. 2018-075022 filed Apr. 9, 2018, the disclosure of which is hereby incorporated by reference herein in its entirety.

BACKGROUND OF THE INVENTION

1. Field of the Invention

The present invention relates to a controller and an editor, and particularly to a controller and an editor that enable a ladder program to escape an infinite loop.

2. Description of the Related Art

One technique to allow a ladder program to repeatedly execute a specific process is to use a jump instruction so that the specific process may be repeatedly executed until an execution condition for the jump instruction becomes false. Such a processing technique is generally referred to as looping.

FIG. 5 illustrates one example of a ladder program that performs a loop process. The loop process is from net number 0100 to net number 0110. A net with net number 0100 includes label 1, and a jump instruction to label 1 is provided on a net with net number 0110. When the process reaches the jump instruction at net number 0110, the process returns to label 1 to restart processing. An execution condition (portion surrounded by dotted lines) is provided immediately before the jump instruction at net number 0110. If the execution condition is false, the program does not execute the jump instruction and exits the loop. In the example in FIG. 5, the jump instruction is executed if the following logical expression (1) is true, and the jump instruction is not executed if the following logical expression (1) is false:

$$(\overline{R0001.0} \text{ AND } F0000.5) \text{ OR } X0000.0 \tag{1}$$

If the design of a loop process has an error, the process in the ladder program may get stuck in an infinite loop without exiting the loop. Such an infinite loop is difficult to detect before the ladder program is executed.

Japanese Patent Application Laid-Open No. 07-210218 discloses a system that detects a ladder program being stuck in an infinite loop at the time of execution of the ladder program, estimates the location of the occurrence of the infinite loop, and shows the location of the cause on a display.

Japanese Patent Application Laid-Open No. 07-210218 discloses a method for detecting an infinite loop, but does not disclose a method for escaping the infinite loop. When a process is stuck in an infinite loop during execution of a ladder program, the ladder program cannot escape the loop. This may interfere with normal control of a machine.

The present invention is accomplished to solve the above-described problem, and an object of the present invention is to provide a controller and an editor that enable a ladder program to escape an infinite loop.

SUMMARY OF THE INVENTION

One aspect of a controller according to the present invention is a controller that can detect a loop process being stuck in an infinite loop during execution of a ladder program. The controller includes an infinite loop escape unit for escaping the infinite loop by forcefully making an execution condition for a jump instruction false when the infinite loop occurs, the jump instruction being included in the loop process.

In one aspect of the controller according to the present invention, the infinite loop escape unit escapes the infinite loop by referring to an infinite loop occurrence condition information table recording at least a state of an execution condition signal on normal completion of the loop process, and forcefully overwriting the current execution condition signal with the execution condition signal on the normal completion.

In one aspect of the controller according to the present invention, the infinite loop escape unit escapes the infinite loop by forcefully overwriting a signal state of a closed contact provided within the jump instruction.

One aspect of the controller according to the present invention further includes an infinite loop detection unit for recording the execution condition signal of the loop process that may cause the infinite loop, in the infinite loop occurrence condition information table.

One aspect of the controller according to the present invention further includes an infinite loop detection unit for recording the state of the execution condition signal on the normal completion of the loop process in the infinite loop occurrence condition information table during execution of the ladder program.

One aspect of an editor according to the present invention is an editor for editing a ladder program. The editor includes an infinite loop detection unit for recording an execution condition signal of a loop process that may cause the infinite loop, in an infinite loop occurrence condition information table.

The present invention provides a controller and an editor that enable a ladder program to escape an infinite loop.

BRIEF DESCRIPTION OF THE DRAWINGS

These and other objects and features of the present invention will become apparent from the following description of exemplary embodiment with reference to the accompanying drawings in which:

FIG. 8 is a view illustrating one example of an infinite loop occurrence condition information table;

FIG. 10 is a view illustrating one example of an infinite loop occurrence condition information table;

DETAILED DESCRIPTION OF THE PREFERRED EMBODIMENT

Figure 1:
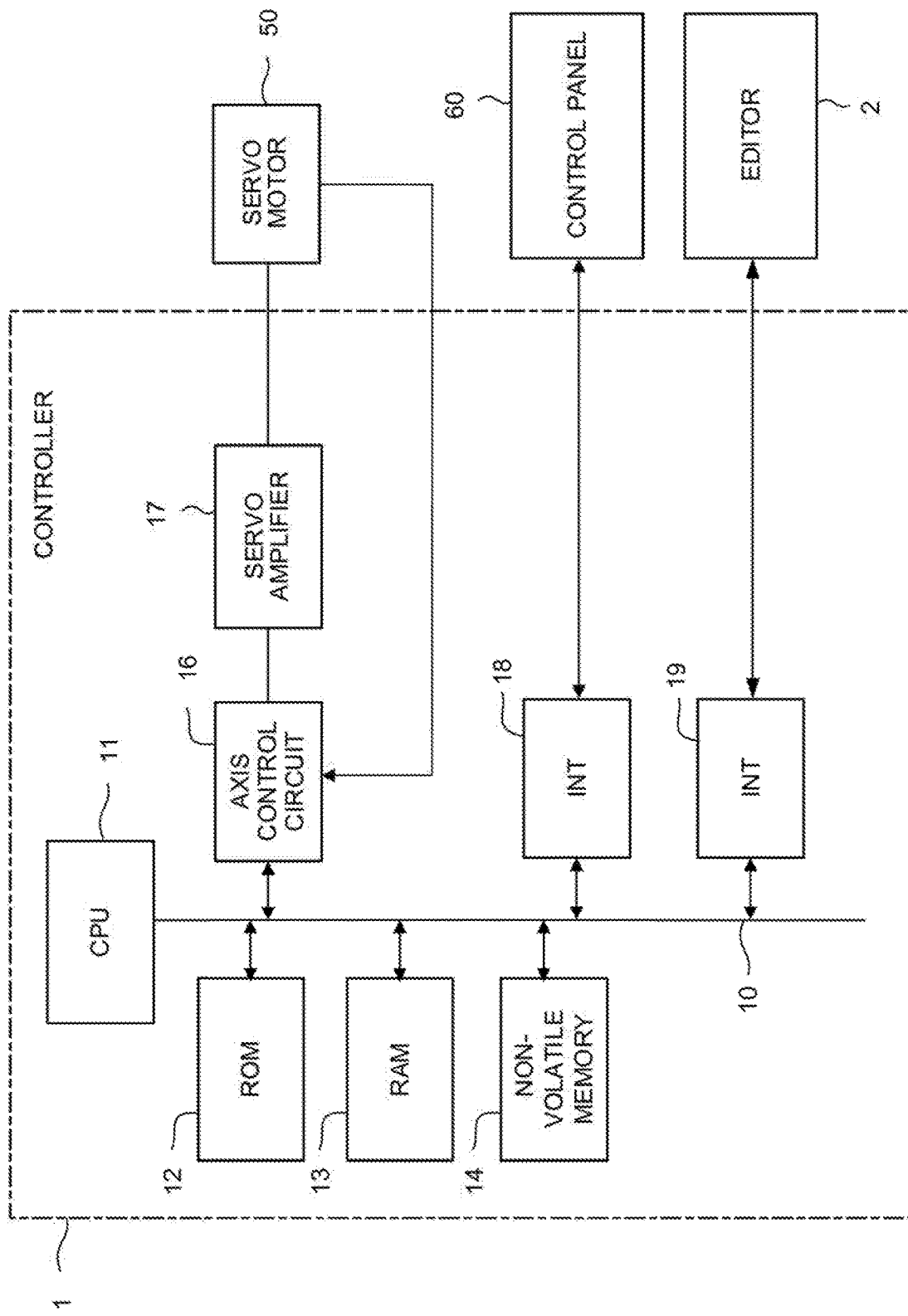
FIG. 1 is a hardware configuration diagram of a controller.
Figure 2:
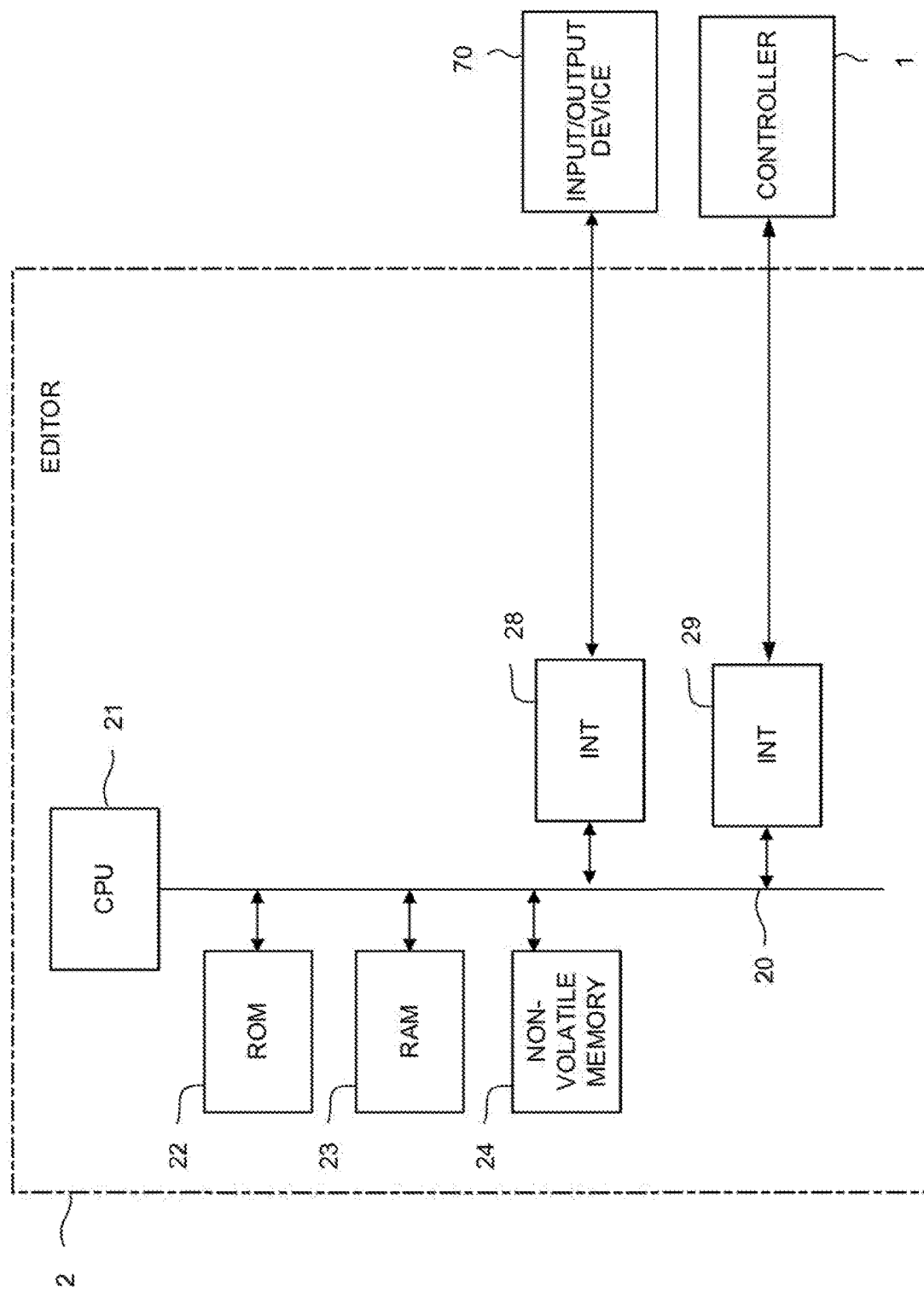
FIG. 2 is a hardware configuration diagram of an editor.

FIGS. 1 and 2 are hardware configuration diagrams schematically illustrating principal portions of a controller 1 and an editor 2 according to a first embodiment of the present invention. The controller 1 is, for example, a device that reads in a ladder program and controls an industrial machine, a robot, or the like (hereinafter simply referred to as a machine). Examples of the controller 1 include a programmable logic controller (PLC), a numerical controller having a PLC function, and the like. The controller 1 includes a CPU 11, a ROM 12, a RAM 13, a non-volatile memory 14, an interface 18, an interface 19, a bus 10, an axis control circuit 16, and a servo amplifier 17. The controller 1 is connected to a servo motor 50, a control panel 60, and the editor 2.

The CPU 11 is a processor that wholly controls the controller 1. The CPU 11 retrieves a system program stored in the ROM 12 through the bus 10 and controls the entire controller 1 in accordance with the system program.

The ROM 12 has system programs that have been stored in advance to execute, for example, various kinds of control of the machine.

The RAM 13 temporarily stores temporary calculation data or display data, data inputted by an operator through the control panel 60, which will be described later, and the like.

The non-volatile memory 14 maintains the state of memory using, for example, an unillustrated battery for memory backup even when the power of the controller 1 is shut off. The non-volatile memory 14 stores data inputted from the control panel 60, ladder programs inputted from the editor 2 through the interface 19, and the like. Such programs and data stored in the non-volatile memory 14 may be loaded into the RAM 13 at the time of execution or use.

The axis control circuit 16 controls an operating axis of the machine. The axis control circuit 16 receives a commanded amount of movement for the axis outputted from the CPU 11, and outputs an axis movement command to the servo amplifier 17.

The servo amplifier 17 receives the axis movement command outputted from the axis control circuit 16 and drives the servo motor 50.

The servo motor 50 is driven by the servo amplifier 17 to move the operating axis of the machine. The servo motor 50 has an internal position and speed detector. The position and speed detector outputs a position and speed feedback signal. This signal is fed back to the axis control circuit 16. Thus, position and speed feedback control is achieved.

It should be noted that FIG. 1 only illustrates one axis control circuit 16, one servo amplifier 17, and one servo motor 50, but actually the same numbers of axis control circuits 16, servo amplifiers 17, and servo motors 50 as the number of axes of the machine to be controlled are prepared. For example, in the case where a robot with six axes is controlled, total of six sets of axis control circuits 16, servo amplifiers 17, and servo motors 50 are prepared to correspond to the respective axes.

The control panel 60 is a data input/output device including a display, hardware keys, and the like. The control panel 60 shows information received from the CPU 11 through the interface 18 on a display. The control panel 60 passes a command, data, or the like inputted from the hardware keys or the like to the CPU 11 through the interface 18.

The interface 19 is a communication interface for connecting the controller 1 and the editor 2.

The editor 2 is an information processing apparatus having the functions of creating and editing a ladder program. An example of the editor 2 is a personal computer (PC). The editor 2 includes a CPU 21, a ROM 22, a RAM 23, a non-volatile memory 24, an interface 28, an interface 29, and a bus 20. The editor 2 is connected to an input/output device 70 and the controller 1.

The CPU 21 is a processor that wholly controls the editor 2. The CPU 21 retrieves a system program stored in the ROM 22 through the bus 20 and controls the entire editor 2 in accordance with the system program.

The ROM 22 has system programs that have been stored in advance to execute various functions of the editor 2.

The RAM 23 temporarily stores temporary calculation data or display data, data inputted by an operator through the input/output device 70, which will be described later, and the like.

The non-volatile memory 24 maintains the state of memory using, for example, an unillustrated battery for memory backup even when the power of the editor 2 is shut off. The non-volatile memory 24 stores a tool (program) for editing a ladder program, ladder programs created or edited using the edit tool, and the like. Such programs and data stored in the non-volatile memory 24 may be loaded into the RAM 23 at the time of execution or use.

The input/output device 70 is a data input/output device including a display and a keyboard. The input/output device 70 shows information received from the CPU 21 through the interface 28 on a display. The input/output device 70 passes data or the like inputted from the keyboard or the like to the CPU 21 through the interface 28.

The interface 29 is a communication interface for connecting the editor 2 and the controller 1.

Figure 3:
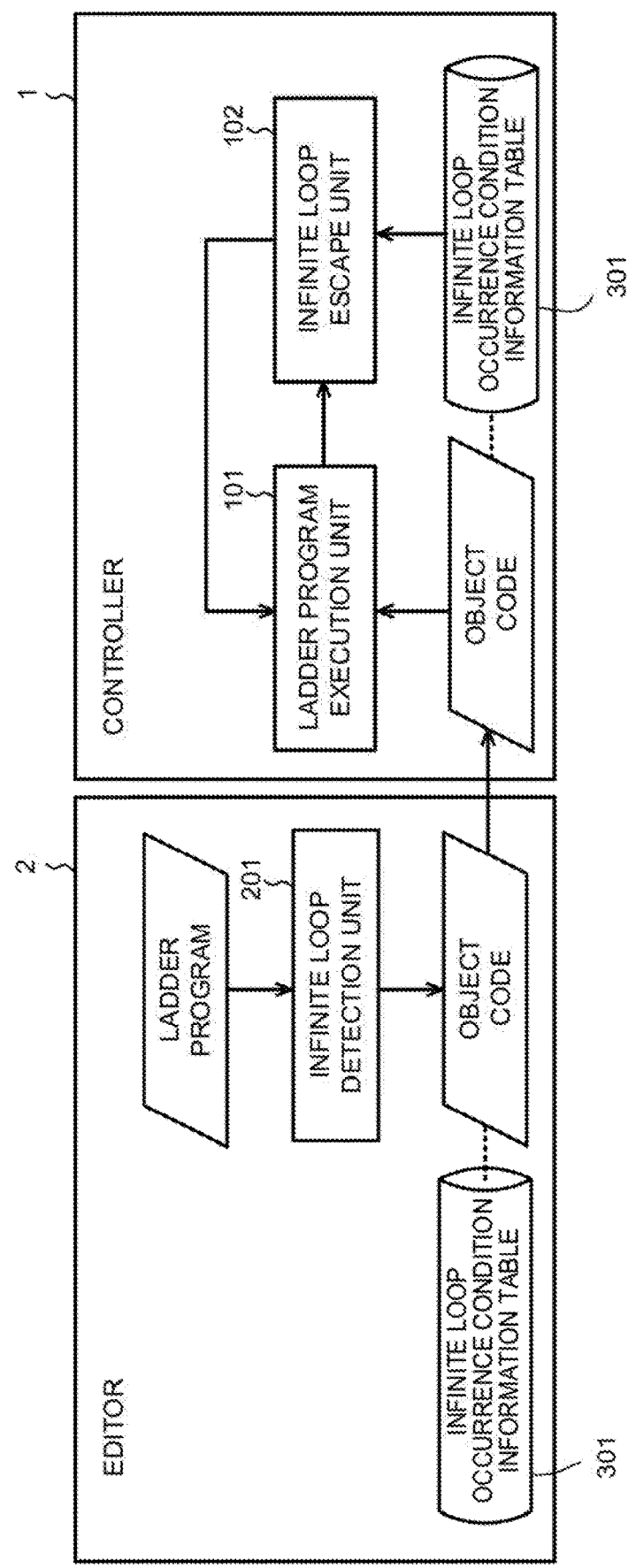
FIG. 3 is a functional block diagram illustrating the controller and the editor.

FIG. 3 is a functional block diagram schematically illustrating the controller 1 and the editor 2 in the first embodiment. The controller 1 includes a ladder program execution unit 101 and an infinite loop escape unit 102. The editor 2 includes an infinite loop detection unit 201. The ladder program execution unit 101, the infinite loop escape unit 102, and the infinite loop detection unit 201 may be realized as, for example, functions of the CPU 11 or 21. For example, the ladder program execution unit 101, the infinite loop escape unit 102, and the infinite loop detection unit 201 are realized by the CPU 11 or 21 executing a program stored in the ROM 12, the ROM 22, the RAM 13, the RAM 23, the non-volatile memory 14, or the non-volatile memory 24.

The infinite loop detection unit 201 is implemented as, for example, one function of a ladder program compiler of the editor 2. The infinite loop detection unit 201 identifies an execution condition for a jump instruction, various signals (hereinafter referred to as execution condition signals) included in the execution condition, and portions that control the various signals when, for example, a ladder program (source code) is compiled. The infinite loop detection unit 201 records such information in an infinite loop occurrence condition information table 301.

The infinite loop detection unit 201 of the present embodiment embeds information representing the infinite loop occurrence condition information table 301 in the object code of a ladder program. For example, the infinite loop detection unit 201 adds the information representing the infinite loop occurrence condition information table 301 to the end of or somewhere in the object code. The infinite loop detection unit 201 transfers the object code to the non-volatile memory 14 or the like of the controller 1.

It should be noted that the infinite loop detection unit 201 may store the infinite loop occurrence condition information table 301 in other file associated with the object code and transfer the file and the object code to the controller 1. Alternatively, the infinite loop detection unit 201 may store the object code or the infinite loop occurrence condition information table 301 in a freely-selected memory area (residing on anywhere on the controller 1, the editor 2, or other apparatus) that is accessible from the controller 1. In the present embodiment, the infinite loop occurrence condition information table 301 is represented as data having a table structure, but information may be stored in other freely-selected data structure (for example, a tree structure or the like).

The ladder program execution unit 101 retrieves and executes the object code of the ladder program that has been transferred to, for example, the non-volatile memory 14.

The infinite loop escape unit 102 monitors the states of the execution condition signals for the jump instruction while the ladder program execution unit 101 is executing the ladder program. The infinite loop escape unit 102 determines whether the process is stuck in an infinite loop (see Japanese Patent Application Laid-Open No. 07-210218 and, if the process is stuck in an infinite loop, informs the outside of the fact that the process is stuck in the infinite loop. The infinite loop escape unit 102 executes a process for escaping the infinite loop.

Figure 4:
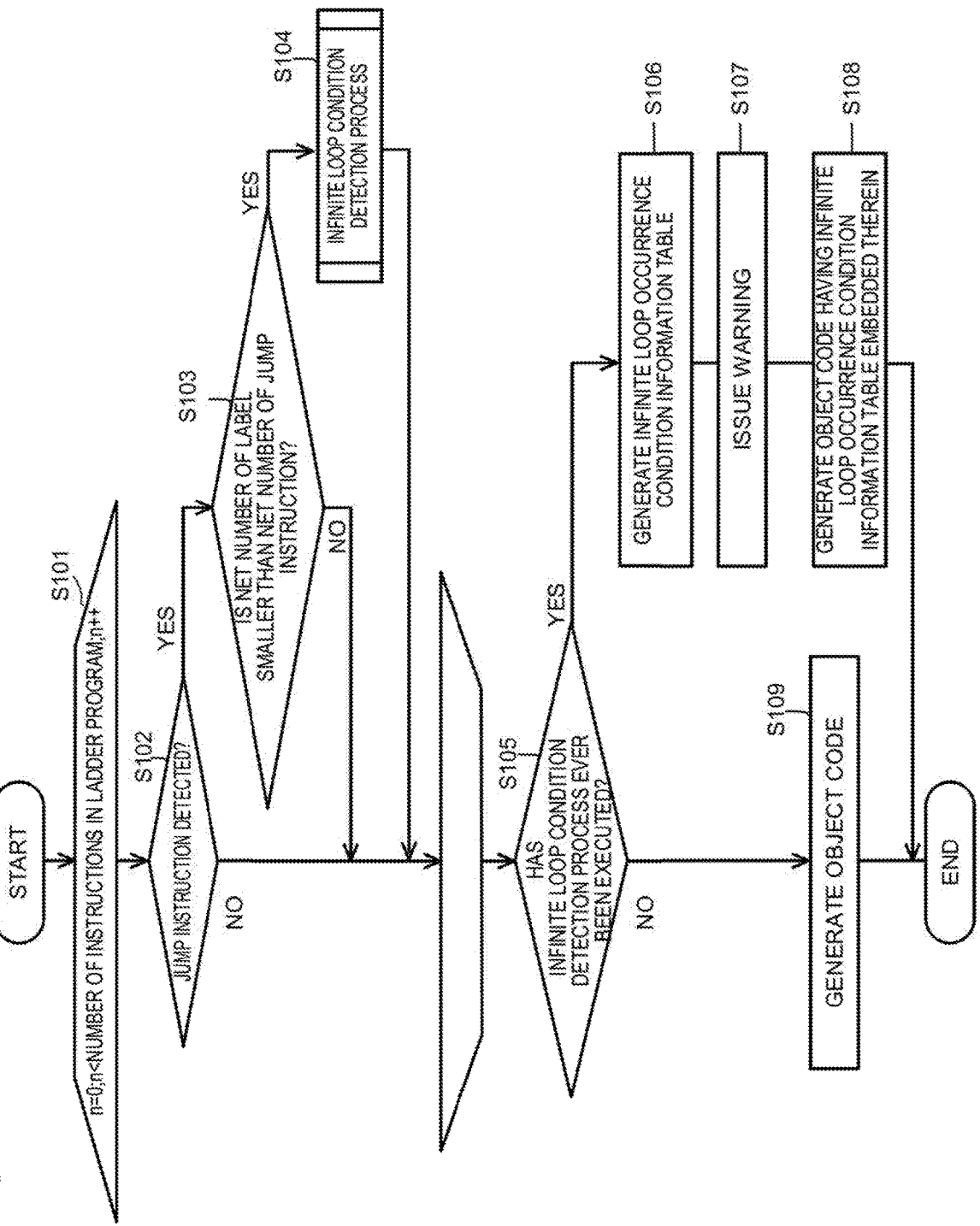
FIG. 4 is a flowchart illustrating a process that is executed in the editor when a ladder program is compiled.

A process that is executed in the editor 2 when a ladder program is compiled will be described with reference to the flowchart in FIG. 4.

<Detection of a Jump Instruction that May Cause an Infinite Loop>

Referring to the flowchart in FIG. 4 and the chart in FIG. 5, a process for detecting a jump instruction that may cause an infinite loop will be described.

S101: The infinite loop detection unit 201 executes the following process from S102 to S104 for each of all nets in a ladder program (source code). Specifically, the infinite loop detection unit 201 repeatedly executes the following process from S102 to S104, in order from the top net to the last net.

S102: The infinite loop detection unit 201 determines whether the net includes a jump instruction. If the net includes a jump instruction, the infinite loop detection unit 201 goes to a process in S103. If the current net includes no jump instruction, the infinite loop detection unit 201 moves to processing the next net.

Figure 5:
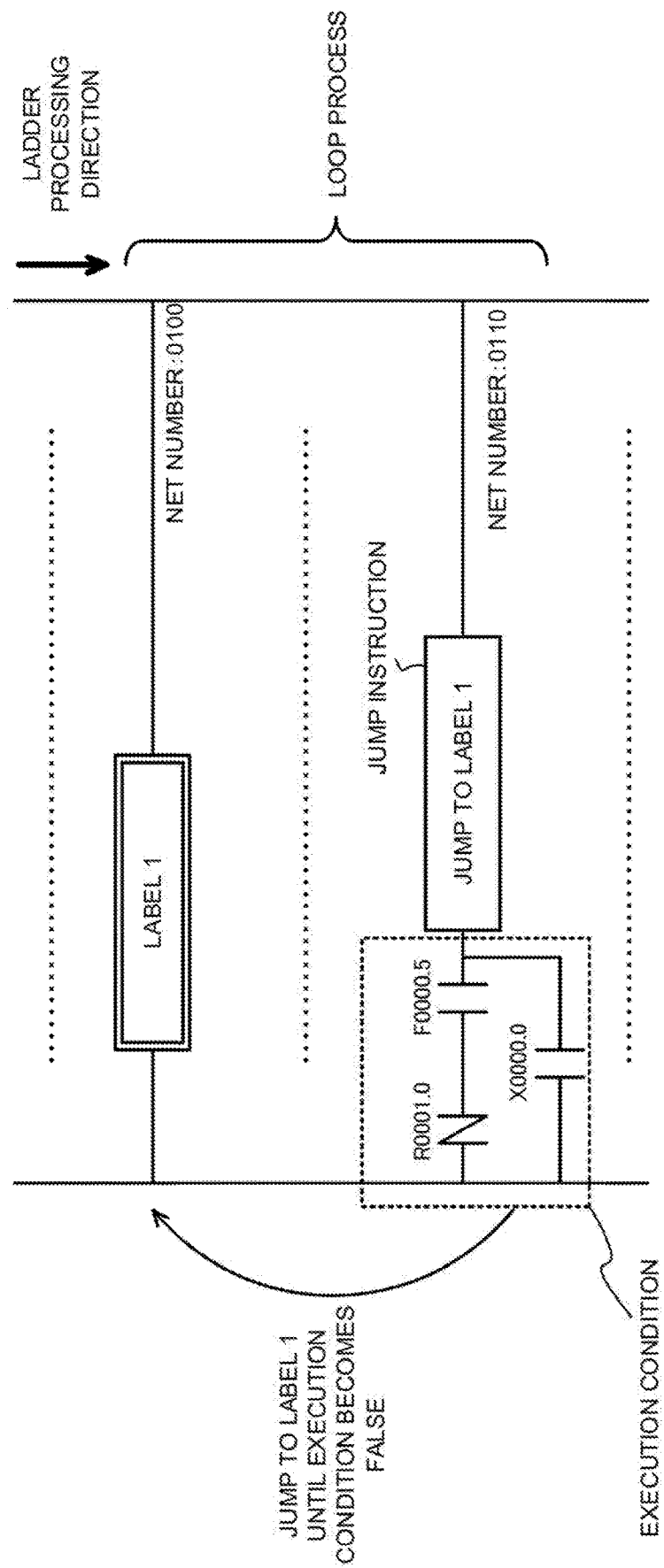
FIG. 5 is a diagram that illustrates a loop process and a jump instruction detection process.

In the example illustrated in FIG. 5, the net with net number 0110 includes a jump instruction.

S103: The infinite loop detection unit 201 compares the net number of the net having the jump instruction and the net number of a net including a label (jump destination) contained in the jump instruction. If the net number of the net including the jump instruction is greater than the net number of the net including the label, the infinite loop detection unit 201 determines that this jump instruction defines a loop process, that is, that this jump instruction may cause an infinite loop, and goes to a process in S104. Otherwise, the infinite loop detection unit 201 moves to processing the next net.

In the example illustrated in FIG. 5, the infinite loop detection unit 201 compares the net number, 0110, of a net including a jump instruction and the net number, 0100, of a net including label 1, which is a destination indicated by the jump instruction. Since the value, 0110, represented by net number 0110 is greater than the value, 0100, represented by net number 0100, it is determined that this jump instruction defines a loop process, that is, that this jump instruction may cause an infinite loop. Generally, if the process jumps in a direction (in the direction in which net number decreases) opposite to the processing direction of the ladder, it is determined that there is a loop process. In the example illustrated in FIG. 5, an execution condition (portion surrounded by dotted lines) is defined immediately before the jump instruction, and the loop process is continued until the execution condition becomes false.

S104: The infinite loop detection unit 201 executes an infinite loop condition detection process.

<Infinite Loop Condition Detection Process>

Figure 6:
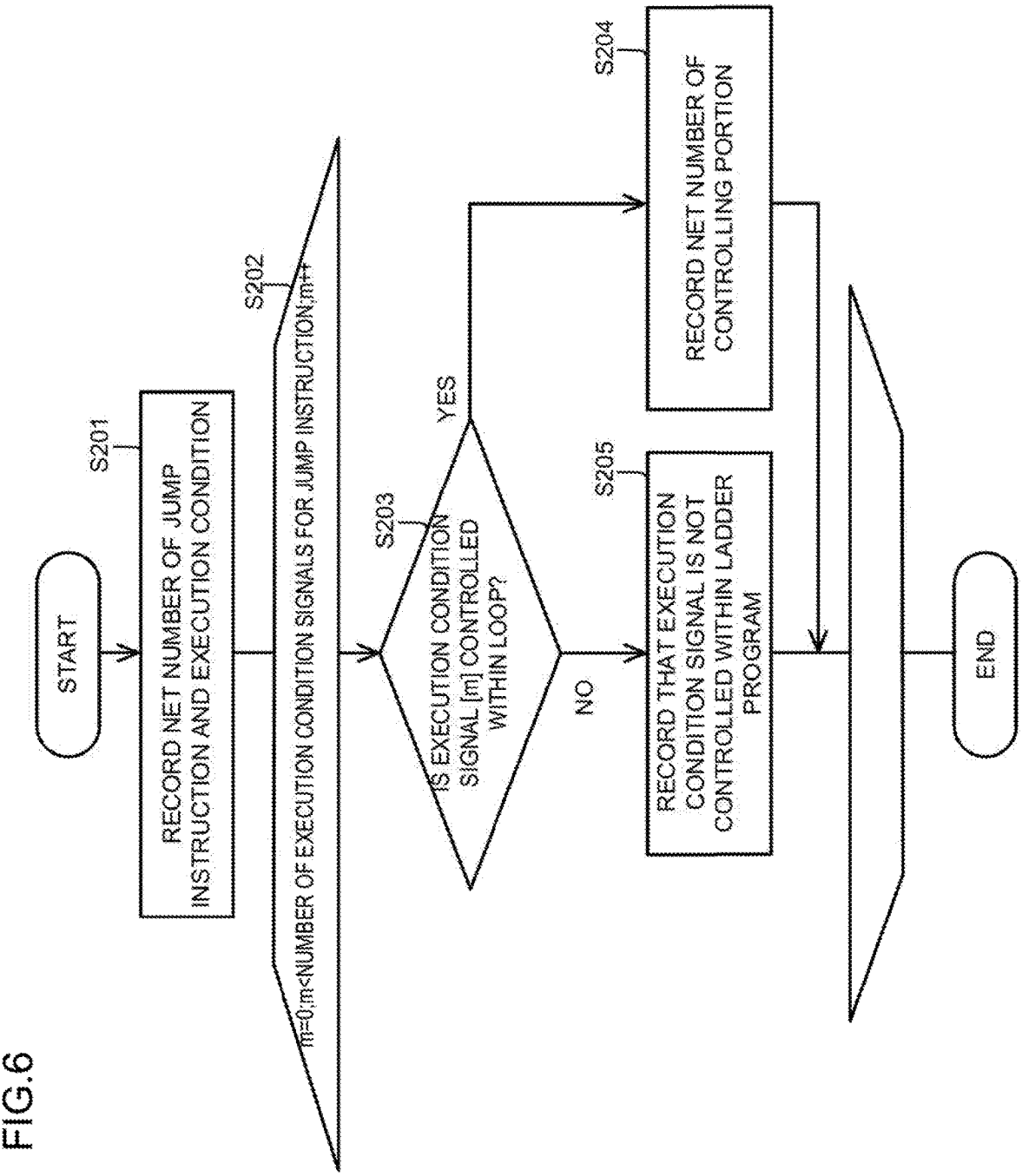
FIG. 6 is a flowchart illustrating an infinite loop condition detection process.

The infinite loop condition detection process in S104 will be described in detail with reference to the flowchart in FIG. 6 and the charts in FIGS. 5 and 7.

S201: The infinite loop detection unit 201 records the net number of the net including the jump instruction and an execution condition for the jump instruction. For example, the infinite loop detection unit 201 records, as the execution condition, at least one execution condition signal included in the execution condition and, if two or more execution condition signals are included therein, a logical expression or the like representing the relationship among the execution condition signals. The infinite loop detection unit 201 temporarily stores these pieces of information in the RAM 23.

In the example illustrated in FIG. 5, a circuit surrounded by dotted lines is the execution condition. This execution condition includes R0001.0, F0000.5, and X0000.0 as execution condition signals. The relationship among these execution condition signals is represented by the aforementioned logical expression (1).

S202: The infinite loop detection unit 201 executes the process from S203 to S205 for each of all execution condition signals recorded in S201.

S203: The infinite loop detection unit 201 searches the ladder program and determines whether the execution condition signal is controlled within the loop. If the execution condition signal is controlled within the loop, the infinite loop detection unit 201 goes to a process in S204. If the execution condition signal is not controlled within the loop, the infinite loop detection unit 201 goes to a process in S205.

Figure 7:
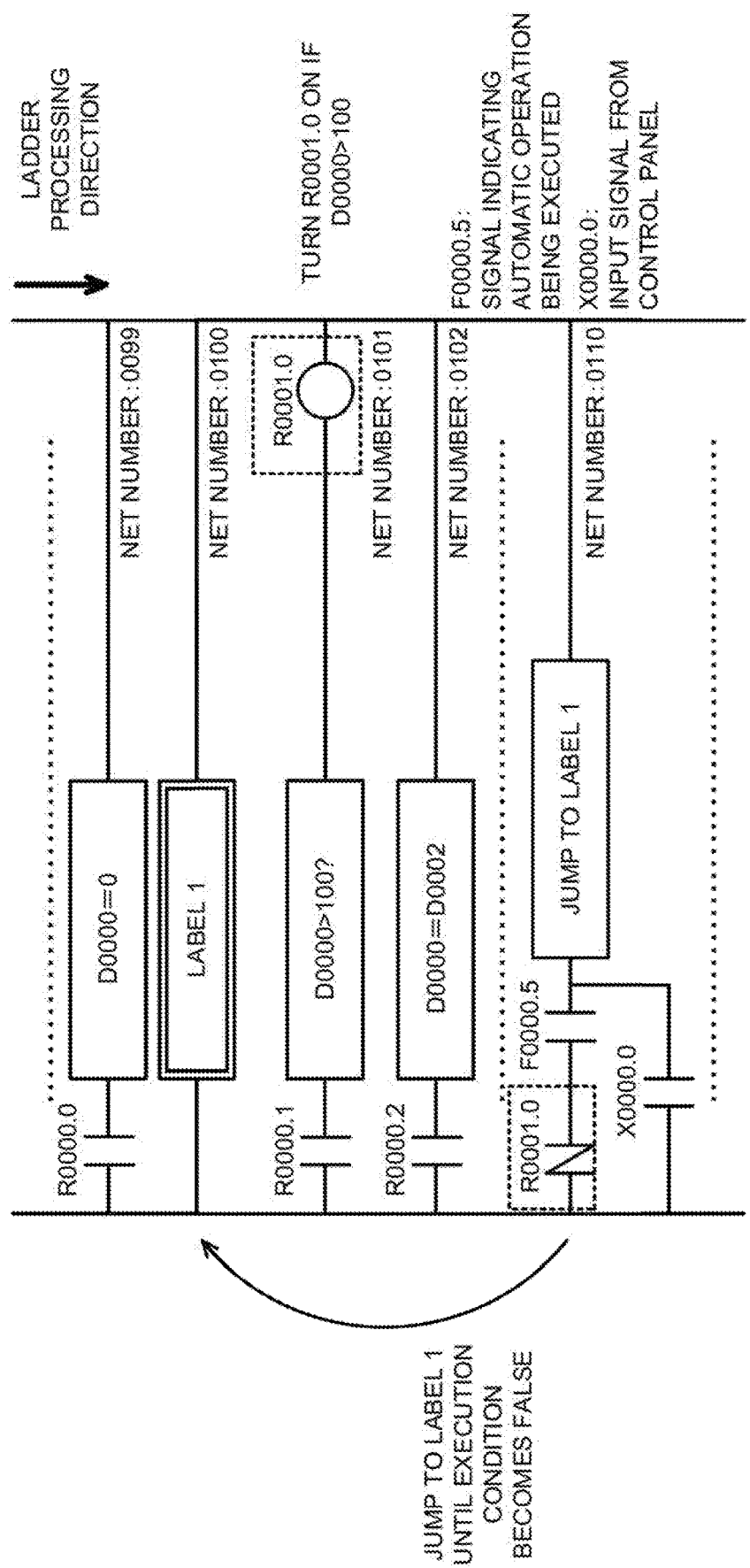
FIG. 7 is a diagram illustrating the infinite loop condition detection process.

In the example illustrated in FIG. 7, the value of execution condition signal R0001.0 (portion surrounded by dotted lines) used as an execution condition at a net with net number 0110 is controlled by a net with net number 0101 within the loop. The net with net number 0101 controls execution condition signal R0001.0 so that execution condition signal R0001.0 may be turned ON if the value of D0000 is greater than 100.

S204: The infinite loop detection unit 201 records the net number of the net that controls the execution condition signal.

In the example illustrated in FIG. 7, the net number, 0101, of the net that controls execution condition signal R0001.0 is recorded.

S205: The infinite loop detection unit 201 records information indicating that the execution condition signal is not controlled within the loop.

In the example illustrated in FIG. 7, execution condition signal F0000.5 is a signal (which the controller 1 can acquire from outside the ladder program) indicating the status in which automatic operation is executed, and execution condition signal X0000.0 is a signal inputted from the control panel 60. In this case, it is recorded that both of execution condition signals F0000.5 and X0000.0 are not controlled within the loop.

<Generation of the Infinite Loop Occurrence Condition Information Table 301>

Referring back to the flowchart in FIG. 4, a process that is performed after the process from S102 to S104 is executed for each of all the nets within the ladder program (source code) will be described.

S105: The infinite loop detection unit 201 determines whether the infinite loop condition detection process (S104) has ever been executed in the process up to this point. If the infinite loop condition detection process has ever been executed, the infinite loop detection unit 201 goes to a process in S106. If the infinite loop condition detection process has not ever been executed, the infinite loop detection unit 201 goes to a process in S109.

S106: The infinite loop detection unit 201 generates the infinite loop occurrence condition information table 301 based on the information recorded in the RAM 23 or the like in S104.

FIG. 8 illustrates one example of the infinite loop occurrence condition information table 301. In the example illustrated in FIG. 8, the net number of a net including each jump instruction that may cause an infinite loop is associated with at least one execution condition signal, a cause (that is, an execution condition; a logical expression representing the relationship among execution condition signals is recorded in the present example) of the infinite loop, and the net number (if there is no controlling portion within the loop, the phrase "without overwriting within loop" is written) of a net that controls each of the at least one execution condition.

S107: The infinite loop detection unit 201 issues a warning to an operator by, for example, showing a result obtained by compiling the ladder program and some or all contents of the infinite loop occurrence condition information table 301 on the display of the input/output device 70.

S108: The infinite loop detection unit 201 embeds information representing the infinite loop occurrence condition information table 301 in the object code of the ladder program. For example, the infinite loop detection unit 201 adds binary data or the like representing the infinite loop occurrence condition information table 301 to the end of the object code. The infinite loop detection unit 201 sends the object code having the information representing the infinite loop occurrence condition information table 301 embedded therein to the controller 1 through the interface 29.

The controller 1 receives the object code having the information representing the infinite loop occurrence condition information table 301 embedded therein through the interface 19, and stores the received object code in the non-volatile memory 14.

S109: The infinite loop detection unit 201 sends the object code of the ladder program to the controller 1 through the interface 29.

The controller 1 receives the object code through the interface 19, and stores the received object code in the non-volatile memory 14.

Figure 9:
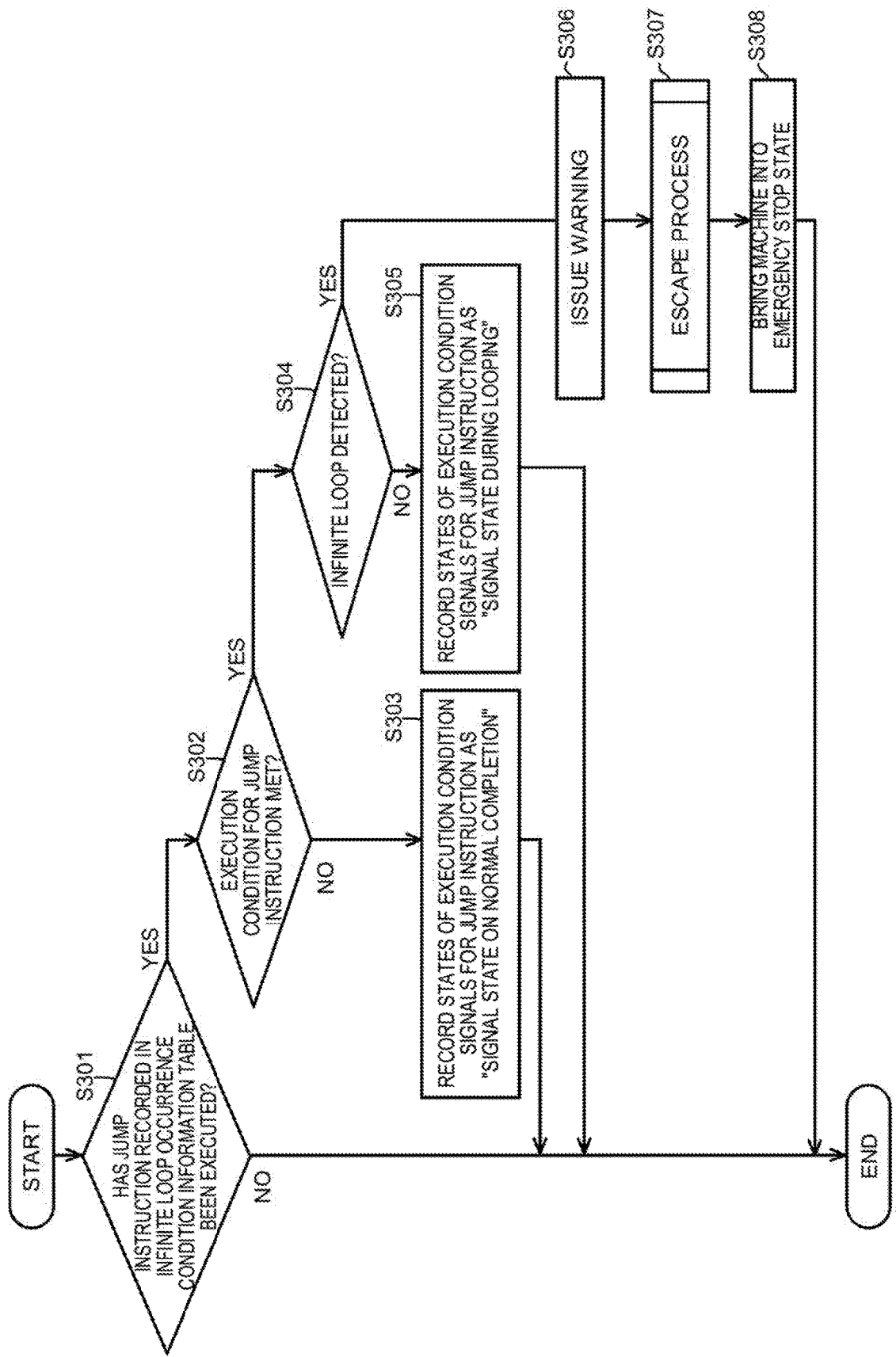
FIG. 9 is a flowchart illustrating a process that is performed in the controller during the execution of a ladder program.

A process that is performed in the controller 1 during the execution of the ladder program will be described with reference to the flowchart in FIG. 9.

<Infinite Loop Determination>

Referring to the flowchart in FIG. 9 and the chart in FIG. 7, a process for detecting an infinite loop will be described.

The ladder program execution unit 101 retrieves, from the non-volatile memory 14, the object code received from the editor 2 in S108, the object code having the information representing the infinite loop occurrence condition information table 301 embedded therein, and executes the object code. The infinite loop escape unit 102 monitors the state of execution of the object code, and executes a process from S301 every time an instruction is executed.

S301: S301 is a process that is performed when the loop process is started. The infinite loop escape unit 102 determines whether a jump instruction recorded in the infinite loop occurrence condition information table 301 has been executed. If a jump instruction recorded in the infinite loop occurrence condition information table 301 has been executed, the infinite loop escape unit 102 goes to a process in S302.

S302: When the process has gone to a net including the jump instruction recorded in the infinite loop occurrence condition information table 301, the infinite loop escape unit 102 determines whether an execution condition for the jump instruction is true. If the execution condition for the jump instruction is true, the infinite loop escape unit 102 goes to a process in S304. If the execution condition for the jump instruction is false, the infinite loop escape unit 102 goes to a process in S303.

S303: S303 is a process that is performed when the loop process has been normally completed. The infinite loop escape unit 102 records the current states (at the time when the execution condition for the jump instruction has been false in S302) of the execution condition signals in the infinite loop occurrence condition information table 301.

FIG. 10 illustrates an example of the infinite loop occurrence condition information table 301 having the states of the execution condition signals recorded therein. The states of the execution condition signals are recorded as "signal state on normal completion".

S304: S304 is a process that is performed when the loop process is continued. The infinite loop escape unit 102 determines whether the loop process is stuck in an infinite loop, using the prior art technique (see Japanese Patent Application Laid-Open No. 07-210218). According to the method described in Japanese Patent Application Laid-Open No. 07-210218, if the scan time exceeds the time-out time of a watchdog timer, the infinite loop escape unit 102 determines that the process is stuck in an infinite loop, and starts sampling a program counter. The infinite loop escape unit 102 records the number of times of sampling for each address, and identifies the location where the infinite loop occurs, based on the distribution of the number of times of sampling with respect to the net number of a net including each address. If the process is stuck in an infinite loop, the infinite loop escape unit 102 goes to a process in S306. If the process is not stuck in an infinite loop, the infinite loop escape unit 102 goes to a process in S305.

S305: S305 is a process that is performed when the loop process is being normally continued. The infinite loop escape unit 102 records the current states (at the time when the process has been determined not to be stuck in an infinite loop in S304) of the execution condition signals in the infinite loop occurrence condition information table 301.

FIG. 10 illustrates an example of the infinite loop occurrence condition information table 301 having the states of the execution condition signals recorded therein. The states of the execution condition signals are recorded as "signal state during looping".

S306: S306 is a process that is executed when the process has gotten stuck in an infinite loop. The infinite loop escape unit 102 shows the following information on the display of the control panel 60 of the controller 1 to inform an operator of the occurrence of an infinite loop (warning):

the location of the occurrence of the infinite loop detected in S304 contents of the infinite loop occurrence condition information table 301, such as
portions that control the execution condition signals for the jump instruction
the states of the execution condition signals (signal state on normal completion, signal state within infinite loop)

S307: The infinite loop escape unit 102 executes an escape process (described later) to force-quit the infinite loop state.

S308: The infinite loop escape unit 102 preferably brings the machine into an emergency stop state. This ensures security.

<Escape from an Infinite Loop>

The escape process in S307 will be specifically described.

Figure 11:
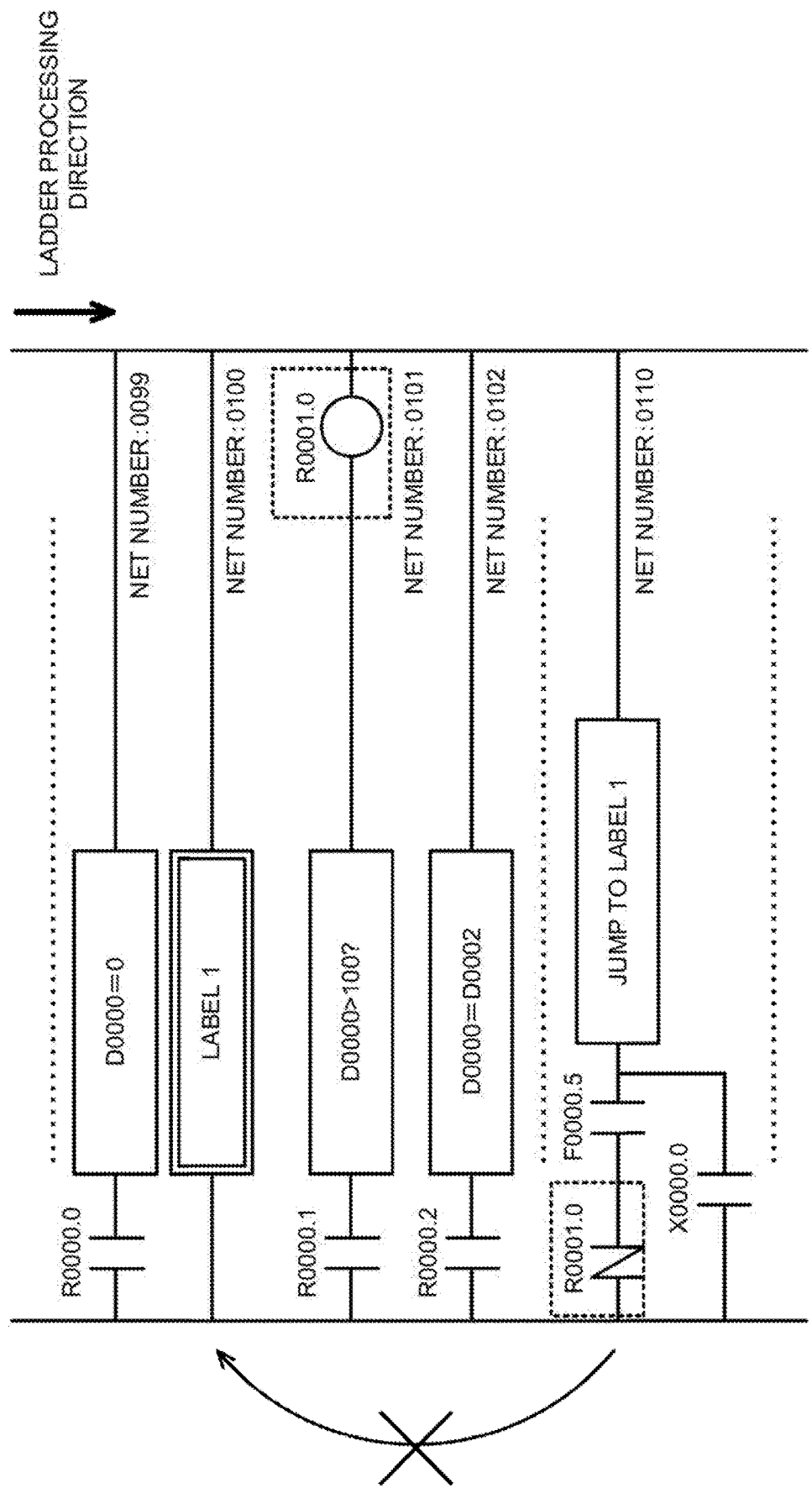
FIG. 11 is a diagram illustrating an escape process.

Referring to FIG. 11, a first escape process will be described.

The infinite loop escape unit 102 refers to the infinite loop occurrence condition information table 301, and compares the states of the execution condition signals on normal completion and the states of the execution condition signals within an infinite loop. This identifies the execution condition signal (portion surrounded by dotted lines) that has caused an infinite loop.

The infinite loop escape unit 102 forcefully overwrites the states of the execution condition signals with an infinite loop stop condition, that is, the signal states on normal completion. This makes the execution condition for the jump instruction false, and makes it possible to escape the infinite loop.

For example, as illustrated in FIG. 10, the states of the execution condition signals within the infinite loop are assumed to be R0001.0=OFF, F0000.5=ON, and X0000.0=OFF, and the states of the execution condition signals on normal completion are assumed to be R0001.0=ON, F0000.5=ON, and X0000.0=OFF. In this case, the infinite loop escape unit 102 forcefully overwrites the states of the execution condition signals with R0001.0=ON, F0000.5=ON, and X0000.0=OFF.

Using a logical expression, an infinite loop forming condition is represented by logical expression (1). In the first escape process, the infinite loop escape unit 102 overwrites the states of the execution condition signals so that an infinite loop stop condition represented by the following logical expression (2) may be met:

$$(R0001.0 \text{ OR } \overline{F0000.5}) \text{ AND } \overline{X0000.0} \qquad (2)$$

Figure 12:
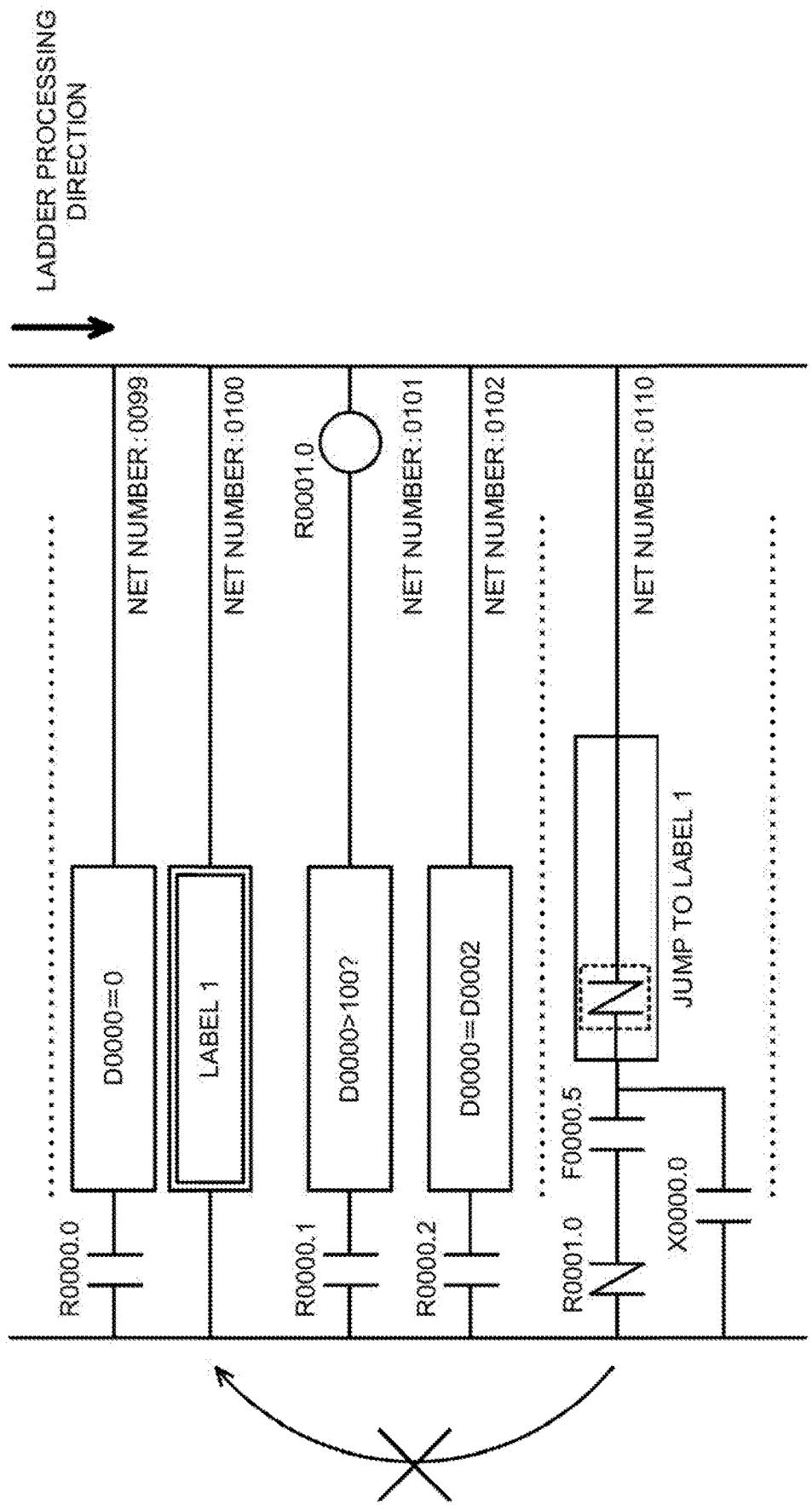
FIG. 12 is a diagram illustrating an escape process.

Referring to FIG. 12, a second escape process will be described.

In the present example, a closed contact (portion surrounded by dotted lines) is assumed to be incorporated in a jump instruction in advance. The infinite loop escape unit 102 forcefully overwrites the closed contact in the jump instruction with ON. This makes the execution condition for the jump instruction false, and makes it possible to escape the infinite loop.

Using a logical expression, a normal infinite loop forming condition is represented by logical expression (1). In the second escape process, the infinite loop escape unit 102 overwrites the infinite loop forming condition with the following logical expression (3):

$$((\overline{R0001.0} \text{ OR } F0000.5) \text{ AND } X0000.0) \text{ AND closed contact in jump instruction being ON} \qquad (3)$$

While the embodiment of the present invention has been described above, the present invention is not limited only to the above-described examples of embodiment, and can be carried out in various aspects by making appropriate modifications thereto.

For example, in the example illustrated in the above-described embodiment, the infinite loop occurrence condition information table 301 records information such as portions that control the execution condition signals for the jump instruction, and such information is shown to an operator when an infinite loop occurs. However, the present invention is not limited to this. Other freely-selected information necessary for solving a problem may be recorded in the infinite loop occurrence condition information table 301 and shown to an operator when an infinite loop occurs. Alternatively, information such as portions that control the execution condition signals for the jump instruction may not be recorded in the infinite loop occurrence condition information table 301 and may not be shown to an operator when an infinite loop occurs. In other words, information except the elements illustrated in FIG. 10 may be or may not be recorded in the infinite loop occurrence condition information table 301.

Further, jump instructions in the present embodiment include various instructions and syntax that are used to describe a loop process in a ladder program.

Moreover, while the controller 1 and the editor 2 are described as different apparatuses in the above-described embodiment, the present invention is not limited to this. Functions of the controller 1 and the editor 2 may be implemented in a single apparatus.

The invention claimed is:

1. A controller and an editor of a machine configured to detect an occurrence of an infinite loop of a loop process during execution of a ladder program, comprising:
    an infinite loop detection unit for:
        monitoring states of execution condition signals for presence of a jump instruction;
        comparing a destination indicated by the jump instruction to a processing direction of the ladder program; and
        recording an execution condition signal of the loop process that may cause the infinite loop, in an infinite loop occurrence condition information table, wherein the recorded execution condition signal is embedded in object code of the ladder program and transmitted to the controller via an interface; and
    an infinite loop escape unit for:
    escaping the occurrence of the infinite loop by forcefully making a completion of an execution condition for a jump instruction false when the infinite loop occurs; and
    entering an emergency stop state of the machine.

2. The controller according to claim 1, wherein the infinite loop escape unit escapes the infinite loop by referring to an infinite loop occurrence condition information table recording at least a state of an execution condition signal on normal completion of the loop process, and forcefully overwriting the current execution condition signal with the execution condition signal on the normal completion.

3. The controller according to claim 1, wherein the infinite loop escape unit escapes the infinite loop by forcefully overwriting a signal state of a closed contact provided within the jump instruction.

4. The controller according to claim 2, further comprising:
    an infinite loop detection unit for recording the state of the execution condition signal on the normal completion of the loop process in the infinite loop occurrence condition information table during execution of the ladder program.

* * * * *